(12) United States Patent
Smith et al.

(10) Patent No.: US 10,430,482 B2
(45) Date of Patent: *Oct. 1, 2019

(54) CUSTOMIZED AND AUTOMATED DYNAMIC INFOGRAPHICS

(71) Applicant: Adobe Inc., San Jose, CA (US)

(72) Inventors: Kevin Gary Smith, Lehi, UT (US); William Brandon George, Pleasant Grove, UT (US); Alan G. Wilson, Cedar Hills, UT (US)

(73) Assignee: Adobe Inc., San Jose, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 15/636,391

(22) Filed: Jun. 28, 2017

(65) Prior Publication Data

US 2017/0300584 A1 Oct. 19, 2017

Related U.S. Application Data

(63) Continuation of application No. 14/452,013, filed on Aug. 5, 2014, now Pat. No. 9,703,820.

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 16/23* (2019.01); *G06Q 10/00* (2013.01);
(Continued)

(58) Field of Classification Search
CPC .... G06F 16/9535; G06F 16/23; G06F 3/0481; G06F 17/248; G06Q 10/00; G06Q 10/10; G06T 11/206
(Continued)

(56) References Cited

U.S. PATENT DOCUMENTS 9,703,820 B2 7/2017 Smith et al.
9,922,096 B2 * 3/2018 Silverstein ........... G06Q 10/105
(Continued)

OTHER PUBLICATIONS

"First Action Interview Office Action", U.S. Appl. No. 14/452,013, dated Oct. 5, 2016, 3 pages.
(Continued)

*Primary Examiner* — Thanh-Ha Dang
(74) *Attorney, Agent, or Firm* — SBMC (57) ABSTRACT

In embodiments of customized and automated dynamic infographics, an infographic template is received at a cloud-based service from a computing device, where a user at the computing device creates the infographic template in a graphics application to display data obtained from data sources. The cloud-based service assigns an identifier to associate the infographic template and the data sources of the data, and posts the infographic template making it available for cloud-based access by other computing devices that request to display the posted infographic template. The cloud-based service can receive a request from one of the computing devices to update the displayed data, and then query the data sources for current data, where the query is based on the identifier that is associated with the posted infographic template. The cloud-based service can then transform the current data to generate updated data, and update the posted infographic template with the updated data.

20 Claims, 8 Drawing Sheets

(51) Int. Cl.
  *G06F 16/23*   (2019.01)
  *G06Q 10/00*   (2012.01)
  *G06Q 10/10*   (2012.01)
  G06F 17/24    (2006.01)
  G06F 3/0481   (2013.01)
  G06T 11/20    (2006.01)

(52) U.S. Cl.
  CPC .......... *G06Q 10/10* (2013.01); *G06F 3/0481* (2013.01); *G06F 17/248* (2013.01); *G06T 11/206* (2013.01)

(58) Field of Classification Search
  USPC ......................................................... 707/756
  See application file for complete search history.

(56) References Cited

U.S. PATENT DOCUMENTS

| | | |
|---|---|---|
| 2011/0131482 A1 | 6/2011 | Shteinvil et al. |
| 2013/0187926 A1* | 7/2013 | Silverstein ........... G06Q 10/105 345/440 |
| 2013/0326499 A1 | 12/2013 | Mowatt et al. |
| 2013/0332387 A1 | 12/2013 | Mirra et al. |
| 2013/0332862 A1 | 12/2013 | Mirra et al. |
| 2014/0059498 A1 | 2/2014 | McCormack et al. |
| 2014/0089349 A1 | 3/2014 | Mercier et al. |
| 2014/0189608 A1 | 7/2014 | Shuttleworth et al. |
| 2014/0299662 A1 | 10/2014 | Harrison |
| 2015/0135056 A1* | 5/2015 | Sekharan .............. G06F 16/972 715/234 |
| 2016/0042041 A1 | 2/2016 | Smith et al. |
| 2016/0078002 A1 | 3/2016 | Hailpern et al. |

OTHER PUBLICATIONS

"Notice of Allowance", U.S. Appl. No. 14/452,013, dated Mar. 6, 2017, 15 pages.

"Pre-Interview Communication", U.S. Appl. No. 14/452,013, dated Jul. 1, 2016, 3 pages.

* cited by examiner

CUSTOMIZED AND AUTOMATED DYNAMIC INFOGRAPHICS

RELATED APPLICATION

This application is a continuation of and claims priority to U.S. patent application Ser. No. 14/452,013 filed Aug. 5, 2014 entitled "Customized and Automated Dynamic Infographics", the disclosure of which is incorporated by reference herein in its entirety.

BACKGROUND

Analytics data can be very complex and is often represented in dashboards as many reports displayed for viewing. For many years, analysts and other users of similar type data have struggled to provide attractive and easily consumable summaries of the data to those who do not want to browse through dashboards full of reports. Historically, this means that a user has to generate multiple reports, pull the data out into spreadsheets, manipulate that data, and then manually incorporate the summarized data into a static custom built report that has been designed in some creative software. The process is very tedious and time consuming, only to output a completely static report, which means that any iteration is manual and often nearly as time consuming as when generating the original report.

SUMMARY

This Summary introduces features and concepts of customized and automated dynamic infographics, which is further described below in the Detailed Description and/or shown in the Figures. This Summary should not be considered to describe essential features of the claimed subject matter, nor used to determine or limit the scope of the claimed subject matter.

Customized and automated dynamic infographics are described. In embodiments, a cloud-based service receives and maintains infographic templates received from computing devices. A user at a computing device can create an infographic template in a graphics application to display data that is obtained from various data sources. The cloud-based service assigns an identifier to associate an infographic template with the data sources of the data that is displayed in the infographic template. The cloud-based service can then post the infographic template making it available for cloud-based access by users of other computing devices that request to display the posted infographic template. For example, a user may create a customized report utilizing a creative software application, and the report has a customized user interface to display summarized analytics data (or other types of data) that the user has distilled from initial data obtained from one or more of the various sources. The customized report can then be posted, making it available for cloud-based access and viewing via the computing devices of other users.

In embodiments, the cloud-based service can receive a request from a user of one of the computing devices to update the data that is displayed in a posted infographic template. The cloud-based service can then query the data sources for current data, where the query is based on the identifier that associates the posted infographic template with the various data sources. The cloud-based service can then transform the current data to generate updated data, and update the posted infographic template with the updated data. The data that is displayed in the posted infographic template is updated independent of the graphics application in which the infographic template is created. For example, a user that is viewing a customized report as the posted infographic template can request a data update to refresh the data, such as over a different range of dates. The cloud-based service can then query the data sources for current, up-to-date data, and transform the current data to be displayed for the requesting user in the posted infographic template.

BRIEF DESCRIPTION OF THE DRAWINGS

Embodiments of customized and automated dynamic infographics are described with reference to the following Figures. The same numbers may be used throughout to reference like features and components that are shown in the Figures.

DETAILED DESCRIPTION

Embodiments of customized and automated dynamic infographics are described. The described techniques provide the ability to incorporate data directly into a creative tool (e.g., a creative software application), allowing for ease of data integration and removing the need to run and update multiple reports. The techniques bind the data sources of the data to an infographic template, making future updates dynamic and easy for a user to initiate. Rather than starting from scratch to regenerate a report, the data sources can be refreshed, and using the stored data bindings, the same translations can be applied to the data and the results automatically mirrored to the template. This also enables additional functionality, such as the ability to obtain dynamic content quickly in static contexts, such as JPEGs or in a portable document format (PDF), and the ability to schedule reports on a regular basis so that a user may receive a dynamically updated graphic regularly, such as by email or other messaging application.

An infographic (also referred to as an information graphic) is a graphic, visual representation of any type of data or information, presented by utilizing graphics for data visualization, which generally enhances a user's ability to discern a context of the data or information. For example, a user may create a customized report utilizing a creative software application, and the report has a customized infographic to display summarized analytics data or metrics (or other types of data) that the user has distilled down into an informative summary report. An infographic template is a template of the infographic, which includes graphics and other data visualization features that can then be dynamically updated based on the data received from various data sources.

The described techniques also provide the ability to re-render an infographic template independent of the creative software application used to initially create the infographic template, such as by using scalable vector graphics (SVGs) and updating the underlying data. An infographic template can be posted, making it available for cloud-based access in a live dynamic environment, such as via the Internet or as a mobile application. A Web service can post an infographic template for cloud-based access, making the infographic template available from anywhere, such as when posted to the Web, on an intranet site, on an external website, or to any other similar location for on-line and/or network-based access. The data sources of the data that is displayed in a posted infographic template can then be queried on-demand, and current up-to-date data applied to bound portions of the template. The infographic template can be re-rendered using the updated data, all in the dynamic environment without returning to the creative software application.

While features and concepts of customized and automated dynamic infographics can be implemented in any number of different devices, systems, networks, environments, and/or configurations, embodiments of customized and automated dynamic infographics are described in the context of the following example devices, systems, and methods.

Figure 1:
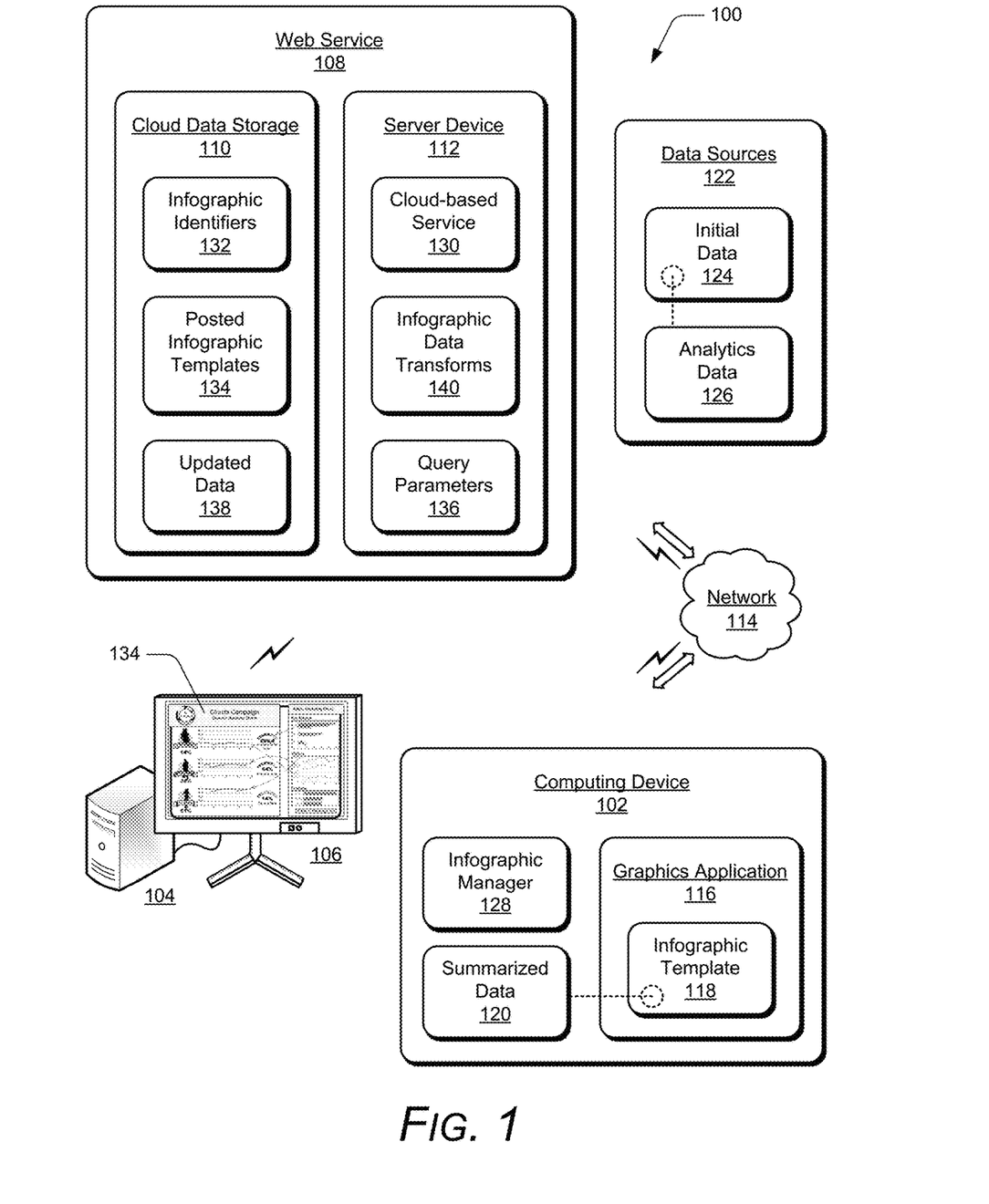
FIG. 1 illustrates an example system in which embodiments of customized and automated dynamic infographics can be implemented.

FIG. 1 illustrates an example system 100 in which embodiments of customized and automated dynamic infographics can be implemented. The example system 100 includes a computing device 102, such as any type of computer, mobile phone, tablet device, media playback device, and other computing, communication, gaming, entertainment, and/or electronic media devices. The computing device 102 can be implemented with various components, such as a processing system and memory, and with any number and combination of differing components as further described with reference to the example device shown in FIG. 10. The example system 100 also includes a client device 104 that is connected to a display device 106. Although shown as a desktop computer, the client device 104 may be implemented as any type of computing device, such as described with reference to the computing device 102. Further, although only two computing devices are shown in this example (i.e., the computing device 102 and the client device 104), the client device 104 is representative of one or multiple different devices, and identified as a client device simply for convenience of discussion to differentiate between the computing device and the client device.

The example system 100 also includes a Web service 108 that users can access via the computing device 102 and the client device 104. The Web service 108 includes cloud data storage 110 that may be implemented as any suitable memory, memory device, or electronic data storage for network-based data storage. The Web service 108 also includes a server device 112 that is representative of one or multiple hardware server devices of the Web service. The cloud data storage 110 and/or the server device 112 may include multiple server devices and applications, and can be implemented with various components, such as a processing system and memory, as well as with any number and combination of differing components as further described with reference to the example device shown in FIG. 10.

Any of the devices, servers, and/or services described herein can communicate via a network 114, such as for data communication between the computing device 102, the client device 104, and the Web service 108. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The computing device 102 can be implemented with a graphics application 116 (or access and interface with an on-line graphics application) by which a user of the computing device can create an infographic template 118 to display summarized data 120. The infographic template 118 is an example of a customized and automated dynamic infographic that a user can create to display any type of data obtained from one or more various data sources. In this example system 100, data sources 122 having initial data 124 are accessible via the network 114, but may also be located and accessible on the computing device 102, at a different computing and/or networked device, or from the Web service 108. For example, a user may create a customized report utilizing a creative software application, and the report has a customized user interface to display summarized analytics data (or other types of data) that the user has distilled down into an informative summary report from analytics data 126 (e.g., as a type of the initial data 124) obtained from one or more of the various data sources 122.

Figure 2:
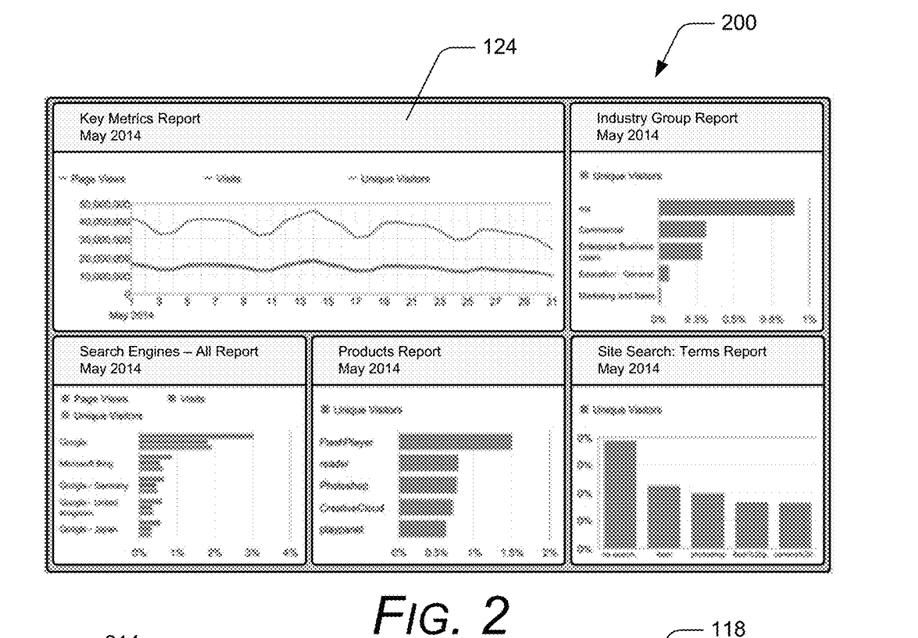
FIG. 2 illustrates an example of initial data that may be distilled into summarized data and displayed in a customized and automated dynamic infographic.

FIG. 2 illustrates an example 200 of the initial data 124 (e.g., in the form of analytics data 126) that may be distilled into the summarized data 120 and displayed in a customized and automated dynamic infographic, such as the infographic template 118. In this example, the analytics data relates to metrics of customers that assess, try out, and/or purchase cloud-based applications.

Figure 3:
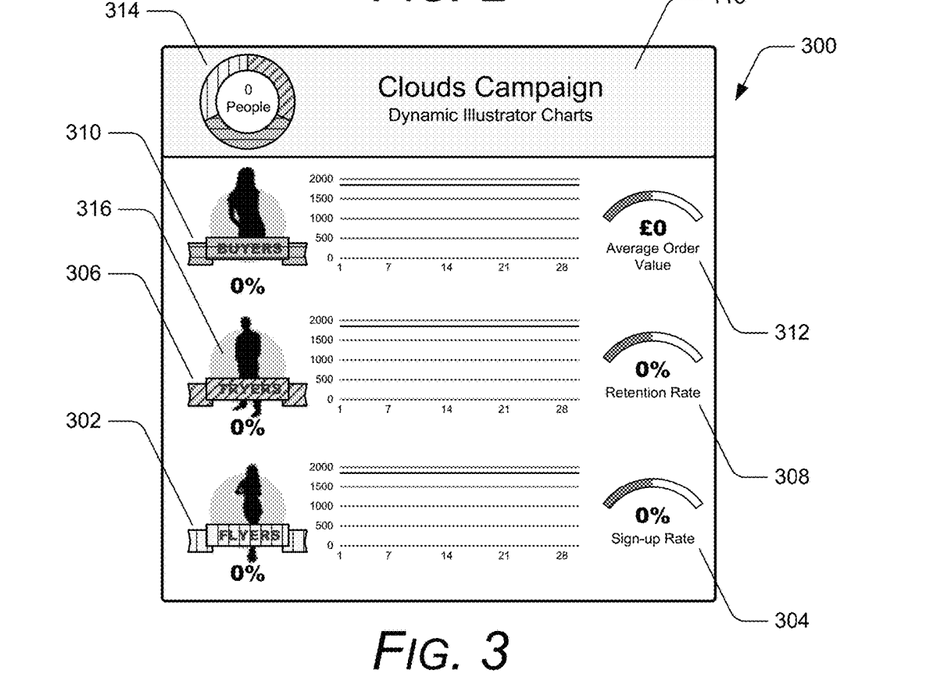
FIG. 3 illustrates an example infographic template created in a graphics application to display data that is obtained from various data sources.

FIG. 3 illustrates an example 300 of the infographic template 118 that is created in the graphics application 116 at the computing device 102 to display the data that is obtained from the various data sources 122. In this example, the infographic template 118 is created to display a percentage of users that are flyers 302 with a graph and percentage sign-up rate 304 of the flyers (e.g., users that assess a cloud-based application); a percentage of the users that are tryers 306 with a graph and percentage retention rate 308 of the tryers; and a percentage of the users that are buyers 310 with a graph and average order value 312 of the buyers. The infographic template 118 also includes a dynamic legend 314 that will indicate a total number of the users (i.e., the flyers 302, the tryers 306, and the buyers 310) and corresponding graphic. The infographic template 118 can also include any other visual elements 316, such as the silhouettes and associated graphics that represent the three different types of users that are tracked by the analytics data.

Figure 4:
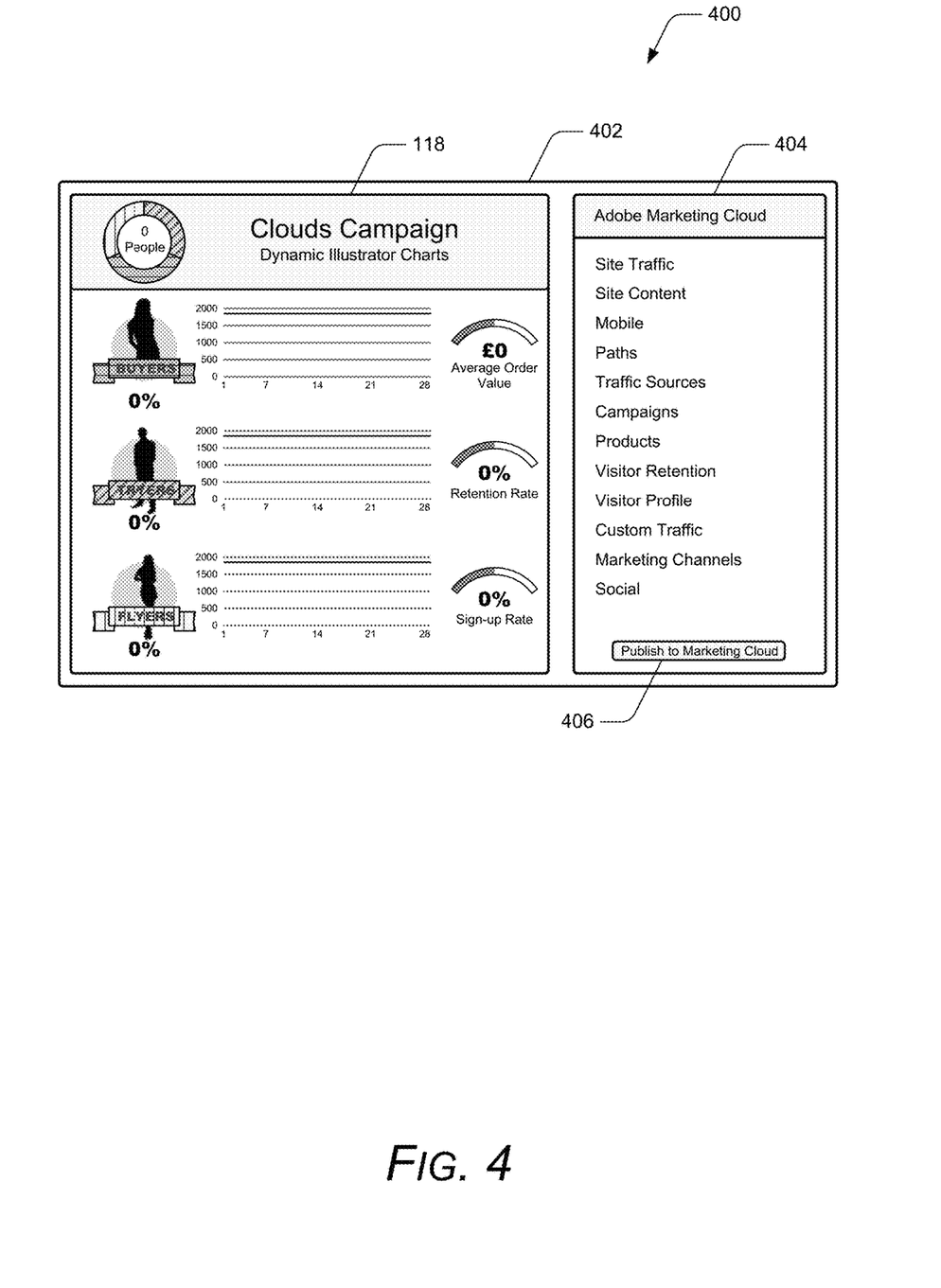
FIG. 4 illustrates an example cloud-based application interface and application plug-in that can be used to develop the example infographic template to display the data.

FIG. 4 illustrates an example 400 of a cloud-based application interface 402 that displays the example infographic template 118 and an application plug-in 404 that can be used to develop the example infographic template to correlate and display the data. A user can also initiate to publish the infographic template 118 from the application plug-in 404 with the user-selectable control 406. In embodiments, an infographic template can be published out in any format (e.g., JPEG, PDF, etc.), which posts the infographic template to anywhere that it will be accessible to others, such as posted to the Web, on an intranet site, on an external website, or to any other similar location for on-line and/or network-based access.

Returning to the discussion of FIG. 1, the computing device 102 includes an infographic manager 128 that can be implemented as a software application or module, such as executable software instructions (e.g., computer-executable instructions) that are executable with a processing system of the computing device to implement embodiments of customized and automated dynamic infographics. The infographic manager 128 can be stored on computer-readable storage media, such as any suitable memory device or electronic data storage implemented by the computing device.

In embodiments, the infographic manager 128 is implemented to generate the infographic template 118 that is created in the graphics application 116 to display the summarized data 120 obtained as the initial data 124 from one or more of the data sources 122. The infographic manager 128 is also implemented to bind the data to the infographic template 118, and publish the infographic template for cloud-based access by users of additional computing devices, such as by a user of the client device 104. The infographic manager 128 can initiate communication of the infographic template 118 to the Web service 108, making the infographic template available for cloud-based access in a live dynamic environment, such as via the Internet or as a mobile application. In the example of the user that creates a customized report as the infographic template 118 to display the summarized analytics data, the customized report can then be communicated and posted for cloud-based access and viewing by a user of the client device 104.

The infographic manager 128 can bind the summarized data 120, or at least a portion of the data, to a graphic feature that is displayed in the infographic template 118 or to a visual element of the infographic template. For example, as shown in FIG. 3, a portion of the summarized data 120 is bound to the graph and percentage sign-up rate 304 (e.g., a graphic feature that is displayed in the infographic template). Alternatively or in addition, a portion of the summarized data 120 can be bound to the silhouettes and associated graphics (e.g., a visual element of the infographic template) that represent the three different types of users. The summarized data can be bound to more than simply text or data graphs in the infographic template. For example, the data may be bound to the height of an image, such as using a graphic of skyscraper buildings as the bars in a bar chart, or bound to the opacity, outline widths, size, location, and/or any other features of an image. Alternatively or in addition, the borders, a drop-shadow, or any other feature of an image or graphic can be implemented to change (e.g., conforming to a data increase or decrease) based on the data that is bound to the feature of the image or graphic.

Figure 5:
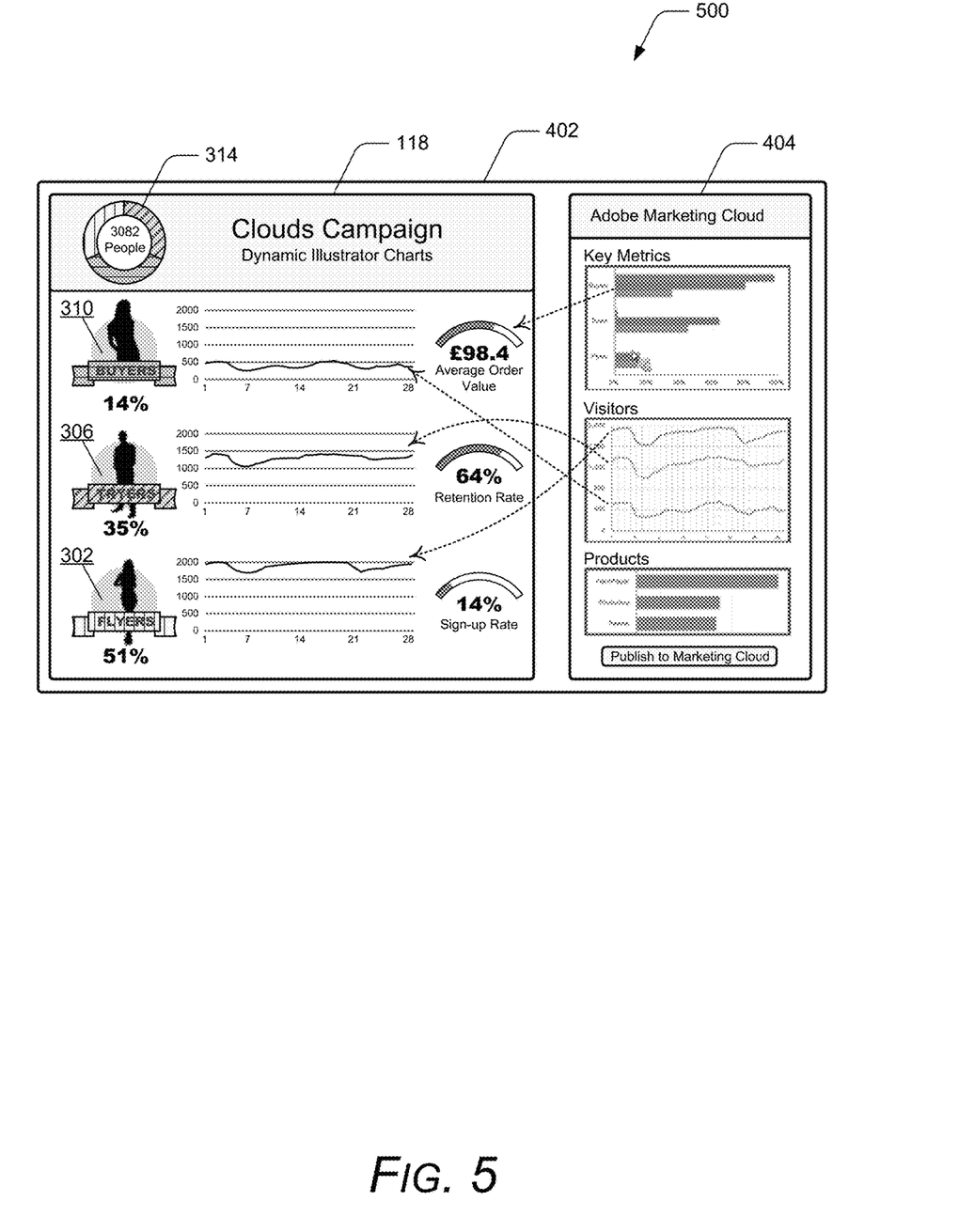
FIG. 5 illustrates an example of the infographic template that displays the summarized data in embodiments of customized and automated dynamic infographics.

FIG. 5 illustrates another example 500 of the cloud-based application interface 402 that displays the example infographic template 118 updated to display the summarized data 120, as well as the application plug-in 404 that pulls-in the summarized data, which is bound to the infographic template. For example, the percentages of the three user types (i.e., the flyers 302, the tryers 306, and the buyers 310) are updated, as well as the respective graphs and associated percentage sign-up rate 304 of the flyers; percentage retention rate 308 of the tryers; and average order value 312 of the buyers. The dynamic legend 314 is also updated to indicate the total number of the users.

Returning to the discussion of FIG. 1, the Web service 108 implements a cloud-based service 130 that can be implemented as a software application or module, such as executable software instructions (e.g., computer-executable instructions) that are executable with a processing system of the server device to implement embodiments of customized and automated dynamic infographics. The cloud-based service 130 can be stored on computer-readable storage media, such as any suitable memory device or electronic data storage implemented by the Web service.

In embodiments, the Web service 108 is implemented to receive and maintain infographic templates, such as the infographic template 118 received from the computing device 102. The cloud-based service 130 assigns infographic identifiers 132 to associate an infographic template with the data sources 122 of the data that is displayed in the infographic template. The cloud-based service 130 can then post the infographic template 118 making it available for cloud-based access by users of other computing devices that request to display the posted infographic template 134. For example, a user of the client device 104 can request to display a posted infographic template 134, which is shown displayed on the display device 106 as the example 500 of the infographic template 118 updated to display the summarized data 120.

The cloud-based service 130 can receive a request from the user of the client device 104 to update the data 120 that is displayed in the posted infographic template 134. The cloud-based service can then query the data sources 122 for current data, where the query is based on the infographic identifier 132 that associates the posted infographic template 134 with the various data sources. The cloud-based service can query the data sources 122 with query parameters 136 that are customized to query for the current data that corresponds to the posted infographic template. In implementations, the query parameters 136 of the data can be communicated via an application program interface (API) that may be edited and customized to query for specific data from a specific data source.

The cloud-based service can then transform the current data received from the data sources 122 to generate updated data 138 based on infographic data transforms 140 that correspond to the posted infographic template. When the infographic template 118 is created and the initial data 124 distilled to generate the summarized data 120, the data transforms implemented by the user to distill down the initial data can be automated and maintained at the Web service 108 as the infographic data transforms 140, and then utilized to update a corresponding posted infographic template.

The cloud-based service 130 can then update the posted infographic template 134 with the updated data 138. It should be noted that the data that is displayed in the posted infographic template can be obtained and updated independent of the computing device 102 or the graphics application 116 in which the infographic template 118 is initially created. Alternatively, the cloud-based service 130 may use the same rendering engine as the graphics application (e.g., the creative tool). However, the posted infographic template is still updated without the need of a user having to open and utilize the graphics application. The cloud-based service can also update additional infographic templates from an updated, posted infographic template based on some or all of the updated data 138 that is received. For example, there may be one or several layers of granularity to the infographic templates and updates. In the same infographic template, elements of a first graph may be bound to a "Products report" from a data source, and a portion of the data (from the same data source or a different data source) may be bound in a second graph to a "Pageviews report".

The posted infographic template 134 is updated with current data obtained from the data sources 122, and without the current data having an association or being integrated with the graphics application. In implementations to update the posted infographic template when a data update or refresh is requested, the cloud-based service 130 can communicate the updated data to the client device 104 that then updates the posted infographic template at the client device to display the updated data. Alternatively, the cloud-based service 130 can generate the updated, posted infographic template with the updated data at the Web service, and then communicate the updated, posted infographic template to the computing device 104 for display. The client device 104 can receive an image of the updated, posted infographic template 134 from the Web service for display at the client device. Alternatively, the client device 104 receives either just the updated data, or the transformation steps (so that the client device can update itself without knowing the data format), and an image of the updated, posted infographic template is generated directly at the client device.

Figure 6:
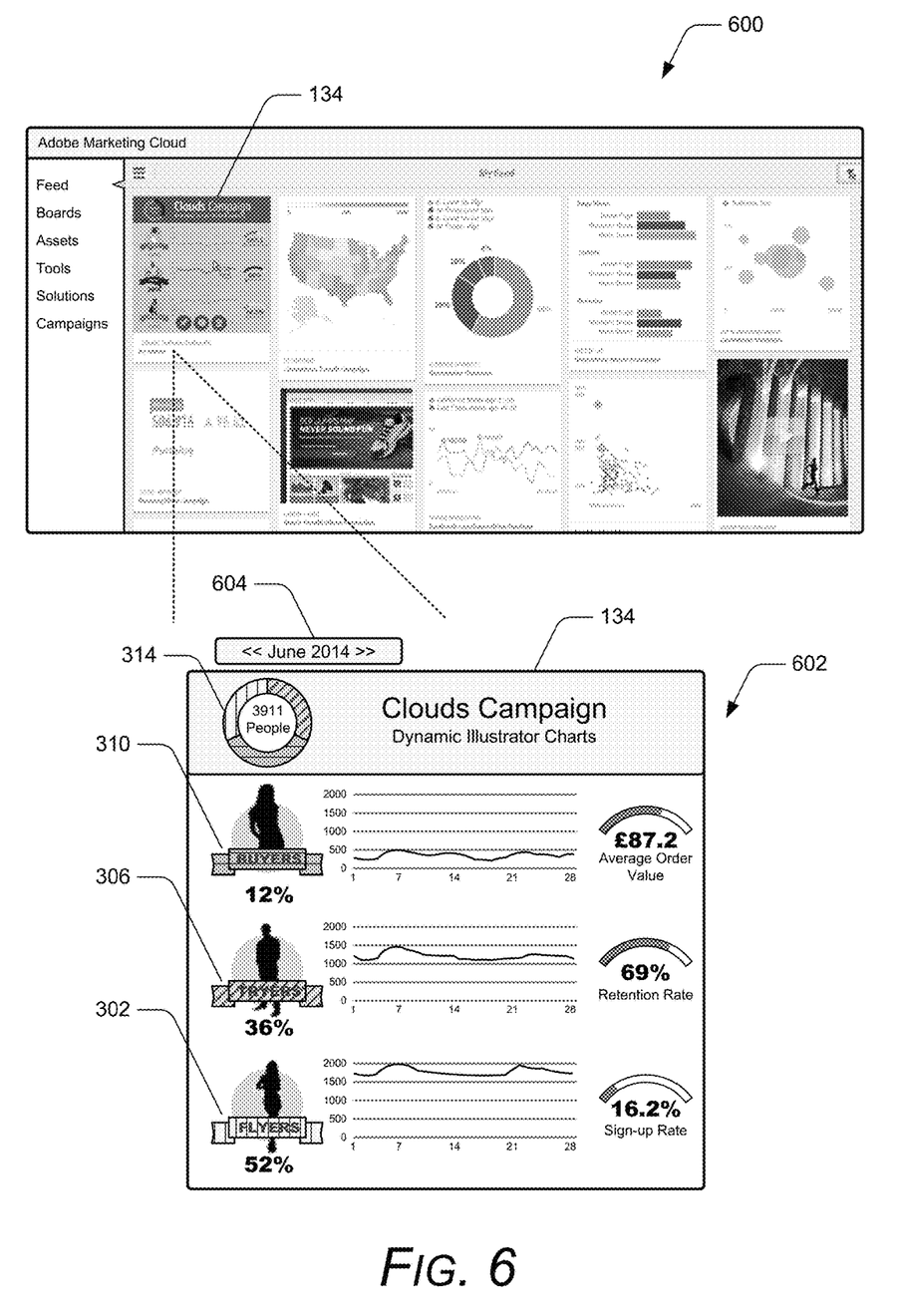
FIG. 6 illustrates an example of the infographic template posted and made available for cloud-based access, and a dynamic update of the summarized data that is displayed in the posted infographic template.

FIG. 6 illustrates an example 600 of the posted infographic template 134 published for cloud-based access, such as in marketing cloud at the Web service 108. A dynamic update of the summarized data 120 is displayed in the posted infographic template shown at 602. For example, a user of the client device 104 that is viewing a customized report as the posted infographic template 134 can request a data update to refresh the data, such as over a different range of dates with a user-selectable control 604. The cloud-based service can then query the data sources 122 for current, up-to-date data, and transform the current data to be displayed for the requesting user in the posted infographic template. For example, the percentages of the three user types (i.e., the flyers 302, the tryers 306, and the buyers 310) are updated, as well as the respective graphs and associated percentage sign-up rate 304 of the flyers; percentage retention rate 308 of the tryers; and average order value 312 of the buyers. The dynamic legend 314 is also updated to indicate an increase in the total number of the users.

Example methods 700, 800, and 900 are described with reference to respective FIGS. 7, 8, and 9 in accordance with one or more embodiments of customized and automated dynamic infographics. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage memory that is local and/or remote to a computer processing system, and implementations can include software applications, programs, functions, and the like.

Figure 7:
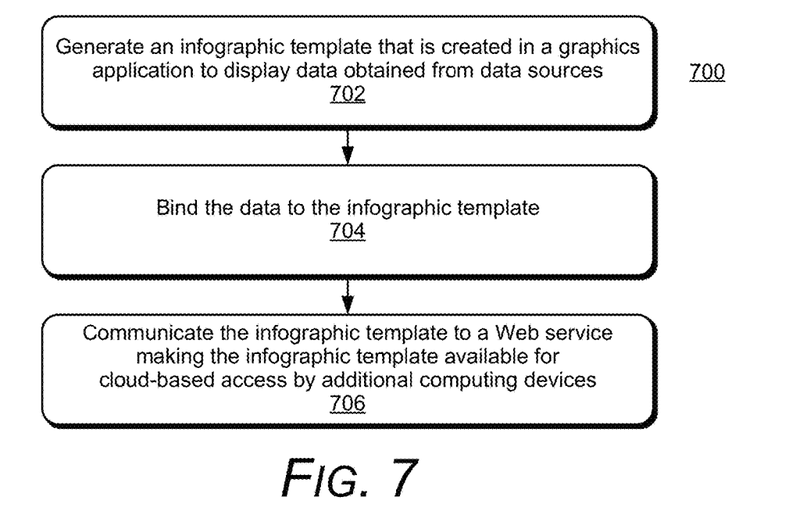
FIGS. 7-9 illustrate example methods of customized and automated dynamic infographics in accordance with one or more embodiments of the techniques described herein.

FIG. 7 illustrates example method(s) 700 of customized and automated dynamic infographics, and is generally described with reference to the example computing device shown in FIG. 1. The order in which the method is described is not intended to be construed as a limitation, and any number or combination of the method operations can be combined in any order to implement a method, or an alternate method.

At 702, an infographic template is generated that has been created in a graphics application to display data obtained from one or more data sources. For example, the infographic manager 128 that is implemented by the computing device 102 (FIG. 1) generates the infographic template 118 that is created by a user in the graphics application 116 to display the summarized data 120, which is obtained from one or more of the various data sources 122 as the initial data 124 and distilled down into an informative summary report. At 704, the data is bound to the infographic template. For example, the infographic manager 128 binds the summarized data 120 to graphic features that are displayed in the infographic template 118 and/or to visual elements of the infographic template.

At 706, the infographic template is communicated to a Web service, making the infographic template available for cloud-based access by additional computing devices. For example, the infographic manager 128 communicates the infographic template 118 to the Web service 108, making the infographic template available for cloud-based access by users of additional computing devices, such as by a user of the client device 104. In the example of the user that creates a customized report as the infographic template 118 to display the summarized analytics data, the customized report can then be posted (also referred to as published) for cloud-based access and viewing by a user of the client device 104.

Figure 8:
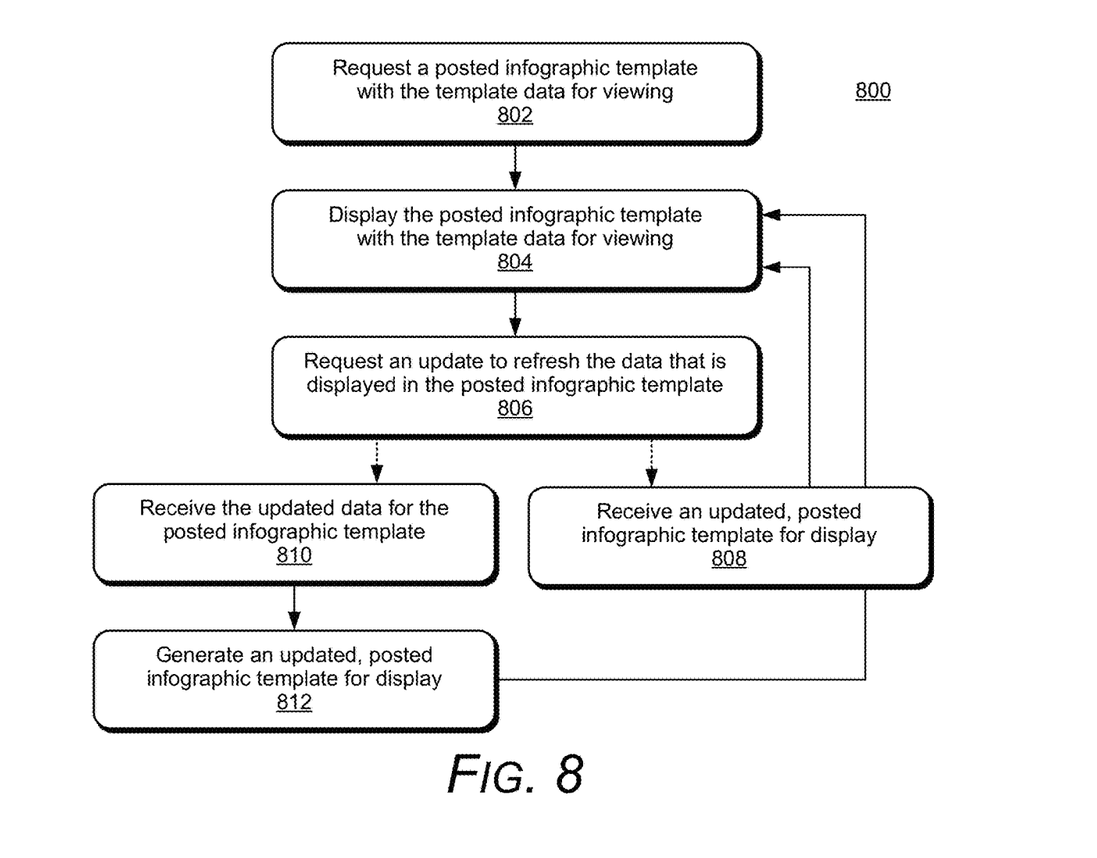

FIG. 8 illustrates example method(s) 800 of customized and automated dynamic infographics, and is generally described with reference to the example client device shown in FIG. 1. The order in which the method is described is not intended to be construed as a limitation, and any number or combination of the method operations can be combined in any order to implement a method, or an alternate method.

At 802, a posted infographic template with the template data for viewing is requested and, at 804, the posted infographic template is displayed with the template data for viewing. For example, a user at the client device 104 (FIG. 1) initiates a request for a posted infographic template 134, and the infographic manager 128 that is implemented by the client device 104 requests the posted infographic template from the Web service 108 to display the posted infographic template, such as on the display device 106 that is connected to the client device 104.

At 806, an update is requested to refresh the data that is displayed in the posted infographic template. For example, the infographic manager 128 that is implemented by the client device 104 initiates a request to the Web service 108 for an update to refresh the data that is displayed in the posted infographic template 134 at the client device.

At 808, the client device optionally receives an updated, posted infographic template for display. For example, the cloud-based service 130 at the Web service 108 generates an updated, posted infographic template with the updated data, and the client device 104 receives the updated, posted infographic template 134 from the Web service for display at the client device (at 804). In this instance, the client device 104 receives an image of the updated, posted infographic template 134 from the Web service for display at the client device.

Alternatively, at 810, the computing device optionally receives the updated data for the posted infographic template and, at 812, generates an updated, posted infographic template for display. For example, the Web service 108 communicates the updated data to the client device 104, and the infographic manager 128 at the client device then updates the posted infographic template 134 to display the updated data (at 804), such as on the display device 106 that is connected to the client device. In this instance, the client device 104 receives either just the updated data, or the transformation steps (so that the client device can update itself without knowing the data format), and an image of the updated, posted infographic template is generated directly at the client device.

Figure 9:
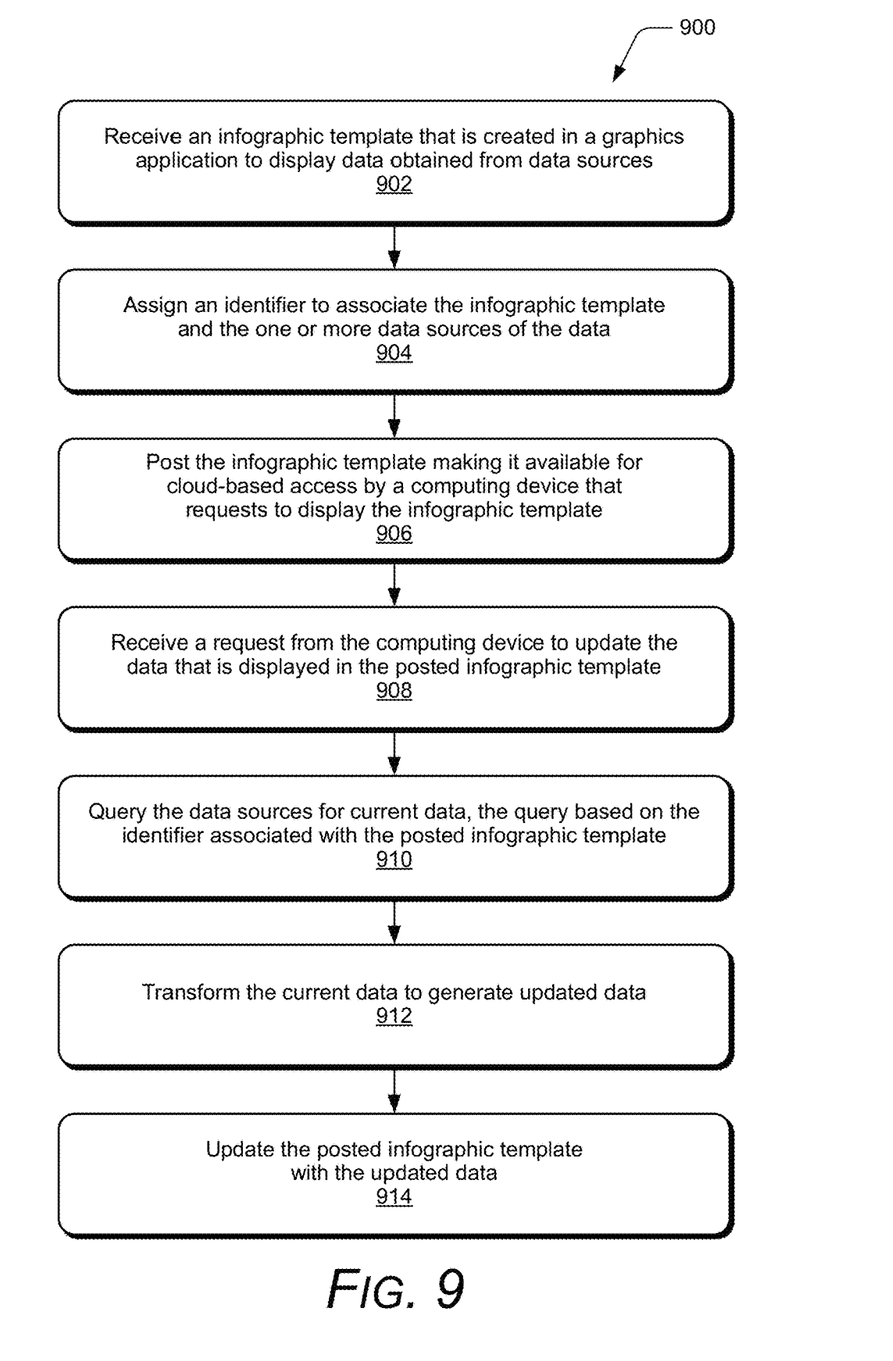

FIG. 9 illustrates example method(s) 900 of customized and automated dynamic infographics, and is generally described with reference to the example Web service shown in FIG. 1. The order in which the method is described is not intended to be construed as a limitation, and any number or combination of the method operations can be combined in any order to implement a method, or an alternate method.

At 902, an infographic template that is created in a graphics application to display data obtained from one or more data sources is received. For example, the cloud-based service 130 that is implemented by the Web service 108 (FIG. 1) receives the infographic template 118 from the computing device 102, where a user creates the infographic template in the graphics application 116 to display the summarized data 120, which is obtained from one or more of the various data sources 122 as the initial data 124 and distilled down into an informative summary report. Generally, the Web service 108 receives and maintains infographic templates received from computing devices.

At 904, an identifier is assigned to associate the infographic template and the one or more data sources of the data. For example, the cloud-based service 130 assigns an infographic identifier 132 to associate the infographic template 118 with the data sources 122 of the data that is displayed in the infographic template. At 906, the infographic template is posted making it available for cloud-based access to display the data at a computing device that requests to display the infographic template. For example, the cloud-based service 130 posted the infographic template 118 for cloud-based access by users of other computing devices that request to display the posted infographic template 134. For example, a user of the client device 104 can request to display a posted infographic template 134, which is shown displayed on the display device 106 as the example 500 of the infographic template 118 updated to display the summarized data 120.

At 908, a request is received from the computing device to update the data that is displayed in the posted infographic template. For example, the cloud-based service 130 receives a request from the user of the client device 104 to update the data 120 that is displayed in the posted infographic template 134. At 910, the one or more data sources are queried for current data, the query being based on the identifier that is associated with the posted infographic template. For example, the cloud-based service 130 queries the data sources 122 for current data, where the query is based on the infographic identifier 132 that associates the posted infographic template 134 with the various data sources. The cloud-based service can query the data sources 122 with query parameters 136 that are customized to query for the current data that corresponds to the posted infographic template. At 912, the current data is transformed to generate updated data. For example, the cloud-based service 130 then transforms the current data received from the data sources 122 to generate updated data 138 based on infographic data transforms 140 that correspond to the posted infographic template.

At 914, the posted infographic template is updated with the updated data. For example, the cloud-based service 130 then updates the posted infographic template 134 with the updated data 138, where updating the posted infographic template is performed independent of the graphics application 116 in which the infographic template 118 is initially created. Alternatively, the cloud-based service 130 uses the same rendering engine as the graphics application (e.g., the creative tool). However, the posted infographic template is still updated without the need of a user having to open and utilize the graphics application. Updating the posted infographic template 134 can include communicating the updated data 138 to the client device 104 that generates an updated infographic template with the updated data for display. Alternatively, updating the posted infographic template 134 can include generating an updated, posted infographic template with the updated data, and then communicating the updated, posted infographic template to the client device 104 for display.

Figure 10:
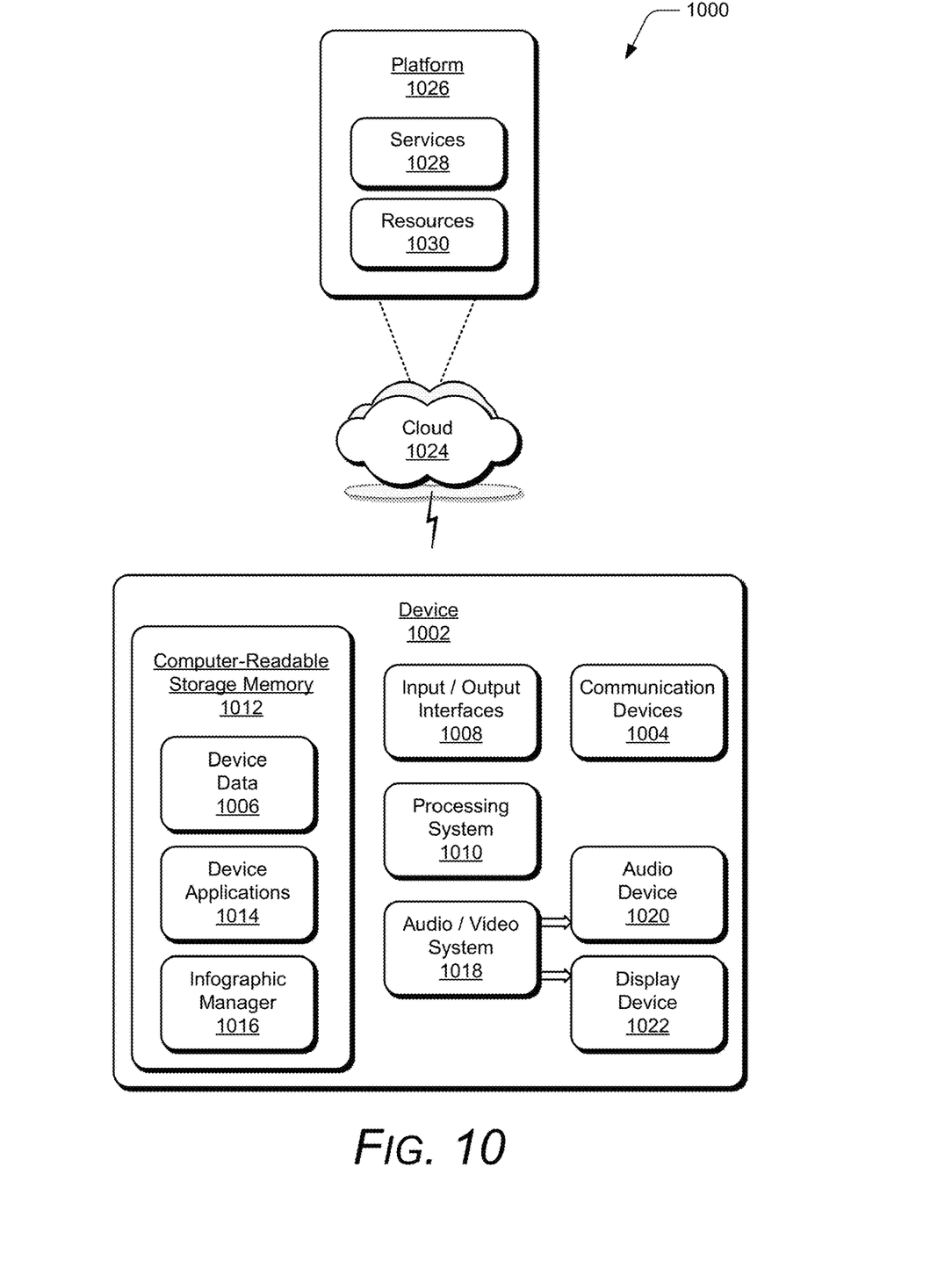
FIG. 10 illustrates an example system with an example device that can implement embodiments of customized and automated dynamic infographics.

FIG. 10 illustrates an example system 1000 that includes an example device 1002, which can implement embodiments of customized and automated dynamic infographics. The example device 1002 can be implemented as any of the computing devices and/or services (e.g., server devices) described with reference to the previous FIGS. 1-9, such as any type of computing device, client device, mobile phone, tablet, communication, entertainment, gaming, media playback, and/or other type of device. For example, the computing device 102, the client device 104, the server device 112, and/or the cloud data storage 110 shown in FIG. 1 may be implemented as the example device 1002.

The device 1002 includes communication devices 1004 that enable wired and/or wireless communication of device data 1006, such as infographic template data that is transferred from one computing device to another, and/or synched between multiple computing devices. The device data can include any type of audio, video, and/or image data, such as application data that is generated by applications executing on the device. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices, such as a digital camera device that may be integrated with device 1002. The I/O interfaces also include data input ports via which any type of data, media content, and/or inputs can be received, such as user inputs to the device, as well as any type of audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage memory 1012, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1012 provides storage of the device data 1006 and various device applications 1014, such as an operating system that is maintained as a software application with the computer-readable storage memory and executed by the processing system 1010. In this example, the device applications also include an infographic manager 1016 that implements embodiments of customized and automated dynamic infographics, such as when the example device 1002 is implemented as the computing device 102 or the client device 104 shown in FIG. 1. An example of the infographic manager 1016 includes the infographic manager 128 that is implemented by the computing device 102 and/or by the client device 104, as described with reference to FIGS. 1-9.

The device 1002 also includes an audio and/or video system 1018 that generates audio data for an audio device 1020 and/or generates display data for a display device 1022. The audio device and/or the display device include any devices that process, display, and/or otherwise render audio, video, display, and/or image data, such as the image content of a digital photo. In implementations, the audio device and/or the display device are integrated components of the example device 1002. Alternatively, the audio device and/or the display device are external, peripheral components to the example device.

In embodiments, at least part of the techniques described for customized and automated dynamic infographics may be implemented in a distributed system, such as over a "cloud" 1024 in a platform 1026. The cloud 1024 includes and/or is representative of the platform 1026 for services 1028 and/or resources 1030. For example, the services 1028 may include the Web service 108, the cloud-based service 130, and/or the cloud data storage 110 described with reference to FIGS. 1-9. Additionally, the resources 1030 may include the infographic identifiers 132 and the published infographic templates 134.

The platform 1026 abstracts underlying functionality of hardware, such as server devices (e.g., included in the services 1028) and/or software resources (e.g., included as the resources 1030), and connects the example device 1002 with other devices, servers, etc. The resources 1030 may also include applications and/or data that can be utilized while computer processing is executed on servers that are remote from the example device 1002. Additionally, the services 1028 and/or the resources 1030 may facilitate subscriber network services, such as over the Internet, a cellular network, or Wi-Fi network. The platform 1026 may also serve to abstract and scale resources to service a demand for the resources 1030 that are implemented via the platform, such as in an interconnected device embodiment with functionality distributed throughout the system 1000. For example, the functionality may be implemented in part at the example device 1002 as well as via the platform 1026 that abstracts the functionality of the cloud 1024.

Although embodiments of customized and automated dynamic infographics have been described in language specific to features and/or methods, the appended claims are not necessarily limited to the specific features or methods described. Rather, the specific features and methods are disclosed as example implementations of customized and automated dynamic infographics.

The invention claimed is:

1. A method for customized and automated dynamic infographics, the method comprising:
   executing a cloud-based service as a computer application on a processor of a server computing device at a Web service to perform:
   posting an infographic template at the Web service, making the posted infographic template available for cloud-based access to display initial data at a computing device that requests to display the posted infographic template, the posted infographic template being displayable at the computing device without a graphics application in which the infographic template is created;
   transforming current data obtained from one or more data sources associated with the initial data to generate updated data, said transforming the current data based on infographic data transforms that are an automated representation of a user summarization of the initial data; and
   updating the posted infographic template at the Web service and at the second computing device with the updated data.

2. The method as recited in claim 1, further comprising: updating one or more additional infographic templates from the updated, posted infographic template based on at least some of the updated data.

3. The method as recited in claim 1, wherein:
   the initial data that is displayed in the posted infographic template is summarized data that has been summarized from the initial data obtained from the one or more data sources; and
   said transforming the current data to generate updated summarized data.

4. The method as recited in claim 1, further comprising querying the one or more data sources with query parameters that are customized to query for the current data to update the initial data that is displayed in the posted infographic template.

5. The method as recited in claim 1, wherein at least a portion of the initial data is bound to one of:
   a graphic feature that is displayed in the posted infographic template; or
   a visual element of the posted infographic template.

6. The method as recited in claim 1, wherein said updating the posted infographic template is performed independent of the graphics application in which the infographic template is created.

7. The method as recited in claim 1, wherein said updating the posted infographic template comprises communicating the updated data to the computing device that generates an updated, posted infographic template with the updated data for display.

8. The method as recited in claim 1, wherein said updating the posted infographic template comprises:
   generating an updated, posted infographic template with the updated data at the Web service; and communicating the updated, posted infographic template to the computing device for display.

9. A server computing device of a Web service implemented for customized and automated dynamic infographics, the server computing device comprising:
- data storage configured to store posted infographic templates received from client computing devices; and
- one or more processors to implement a cloud-based service as a computer application configured to:
- post an infographic template making the posted infographic template available for cloud-based access to display initial data at a computing device that requests to display the posted infographic template, the posted infographic template being displayable at the computing device without a graphics application in which the infographic template is created;
- receive a request from the computing device to update the initial data that is displayed in the posted infographic template;
- transform current data obtained from one or more data sources associated with the initial data to generate updated data, the current data based on infographic data transforms that are an automated representation of a user summarization of the initial data; and
- update the posted infographic template with the updated data.

10. The server computing device as recited in claim 9, wherein:
- the initial data that is displayed in the posted infographic template is summarized data that has been summarized from the initial data obtained from the one or more data sources; and
- the updated data comprises updated summarized data.

11. The server computing device as recited in claim 9, wherein the cloud-based service is configured to query the one or more data sources with query parameters that are customized to query for the current data.

12. The server computing device as recited in claim 9, wherein at least a portion of the initial data is bound to one of:
- a graphic feature that is displayed in the posted infographic template; or
- a visual element of the posted infographic template.

13. The server computing device as recited in claim 9, wherein the cloud-based service is configured to update one or more additional infographic templates based on at least some of the updated data.

14. The server computing device as recited in claim 9, wherein the cloud-based service is configured to communicate the updated data to the computing device that generates an updated, posted infographic template with the updated data for display.

15. The server computing device as recited in claim 9, wherein the cloud-based service is configured to:
- generate an updated, posted infographic template with the updated data; and
- communicate the updated, posted infographic template to the computing device for display.

16. A computing device for generating customized and automated dynamic infographics, the computing device comprising:
- a display device;
- one or more processors to implement a graphics application and an infographic manager, the graphics application configured to generate an infographic template to display initial data obtained from one or more data sources, and the infographic manager configured to:
- configure the infographic template for dynamic update of the initial data with current data based on infographic data transforms that are an automated representation of a user summarization of the initial data; and
- communicate the infographic template to a Web service, making the infographic template available for cloud based access by an additional computing device for display on the additional computing device without the graphics application, the infographic template said configured for the dynamic update at the Web service and at the additional computing device with the current data for display at the additional computing device without the graphics application.

17. The computing device recited in claim 16, wherein the infographic template is configured for the dynamic update of the initial data independent of the graphics application in which the infographic template is created.

18. The computing device recited in claim 16, wherein the infographic manager is configured to bind at least a portion of the initial data to one or more of:
- a graphic feature that is displayed in the infographic template; or
- a visual element of the infographic template.

19. The computing device recited in claim 16, wherein the infographic template is communicated for the cloud-based access with an identifier to associate the infographic template and the one or more data sources of the initial data.

20. The computing device recited in claim 16, wherein the dynamic update of the initial data with current data is performed by the infographic manager independent of the graphics application.

* * * * *